(12) United States Patent
Wang et al.

(10) Patent No.: US 12,391,512 B2
(45) Date of Patent: Aug. 19, 2025

(54) YARN SPINDLE CODING METHOD, ELECTRONIC DEVICE AND STORAGE MEDIUM

(71) Applicants: ZHEJIANG HENGYI PETROCHEMICAL CO., LTD., Zhejiang (CN); HAINING HENGYI NEW MATERIALS CO., LTD., Jiaxing (CN)

(72) Inventors: Peng Wang, Zhejiang (CN); Xiantao Peng, Zhejiang (CN); Yibo Qiu, Zhejiang (CN); Zhongliang Wu, Zhejiang (CN); Guorong Jian, Zhejiang (CN)

(73) Assignees: ZHEJIANG HENGYI PETROCHEMICAL CO., LTD., Hangzhou (CN); HAINING HENGYI NEW MATERIALS CO., LTD., Jiaxing (CN)

( * ) Notice: Subject to any disclaimer, the term of this patent is extended or adjusted under 35 U.S.C. 154(b) by 0 days.

(21) Appl. No.: 18/788,027

(22) Filed: Jul. 29, 2024

(65) Prior Publication Data
US 2025/0153971 A1    May 15, 2025

(30) Foreign Application Priority Data
Nov. 15, 2023    (CN) .......................... 202311519871.X (51) Int. Cl.
*B65H 67/06*    (2006.01)

(52) U.S. Cl.
CPC ....... *B65H 67/063* (2013.01); *B65H 2701/31* (2013.01)

(58) Field of Classification Search
CPC ........... B65H 67/063; D01H 9/04; D01H 9/08
See application file for complete search history.

(56) References Cited

U.S. PATENT DOCUMENTS

| | | | |
|---|---|---|---|
| 5,289,983 A | 3/1994 | Ueda et al. | |
| 5,381,340 A * | 1/1995 | Ueda | B65H 67/063 700/109 |

(Continued)

FOREIGN PATENT DOCUMENTS

| | | |
|---|---|---|
| CN | 212891396 U | 4/2021 |
| CN | 114860787 A | 8/2022 |

(Continued)

OTHER PUBLICATIONS

Notice of Refusal in JP 2024-12090 dated Aug. 20, 2024.

(Continued)

*Primary Examiner* — Anna M Momper
*Assistant Examiner* — Nathaniel L Adams
(74) *Attorney, Agent, or Firm* — Knobbe, Martens, Olson & Bear, LLP (57) ABSTRACT

Provided is a yarn spindle coding method including: when determining that yarn spindles are fully wound, sleeving the yarn spindles in the winding machine sequentially outside a yarn connecting rod of a doffer, and updating the number of unloading times of the winding machine and recording first doffing time of each yarn spindle; generating a first information code of each yarn spindle based on identification information of the winding machine, the updated number of unloading times, the first doffing time and position information of each yarn spindle; and sending each first information code to the doffer, so that the doffer determines a corresponding target yarn spindle among the yarn spindles according to a matching degree between the first doffing time and second doffing time of each yarn spindle recorded by the doffer and code the information code on a corresponding target yarn spindle.

10 Claims, 5 Drawing Sheets

(56) References Cited

U.S. PATENT DOCUMENTS 5,900,553 A      5/1999   Hasegawa
11,459,676 B2 *   10/2022   Archontopoulos .. B65H 67/063

FOREIGN PATENT DOCUMENTS

| | | | | |
|---|---|---|---|---|
| CN | 219258154 | U | 6/2023 | |
| CN | 116605464 | A | 8/2023 | |
| CN | 116788788 | A | 9/2023 | |
| CN | 116882719 | A | 10/2023 | |
| EP | 3305953 | A1 * | 4/2018 | ........... B65H 67/063 |
| EP | 3333109 | A1 | 6/2018 | |
| JP | 2513897 | B2 * | 7/1996 | ........... B65H 67/063 |
| JP | 2001335241 | A | 12/2001 | |
| JP | 2006335442 | A | 12/2006 | |
| JP | 2012224431 | A | 11/2012 | |
| JP | 2020007076 | A | 1/2020 | |
| JP | 2021017313 | A * | 2/2021 | |
| WO | WO 2018072405 | A1 | 4/2018 | |

OTHER PUBLICATIONS

Office Action received in Chinese Patent Application No. 202311519871.X, dated Dec. 28, 2023.

Notification to Grant Patent Right for Invention received in Chinese Patent Application No. 202311519871.X, dated Jan. 11, 2024.

* cited by examiner

YARN SPINDLE CODING METHOD, ELECTRONIC DEVICE AND STORAGE MEDIUM

CROSS-REFERENCE TO RELATED APPLICATIONS

The present application claims priority to Chinese Patent Application No. CN202311519871.X, filed with the China National Intellectual Property Administration on Nov. 15, 2023, the disclosure of which is hereby incorporated herein by reference in its entirety.

TECHNICAL FIELD

The present disclosure relates to the field of computer technology. The present disclosure specifically relates to a yarn spindle coding method and apparatus, an electronic device and a storage medium.

BACKGROUND

In the production process of chemical fiber products, a winding machine is used to wind the fiber yarn to obtain a plurality of yarn spindles. After these yarn spindles are wound or packaged, these yarn spindles need to be coded to identify the production information of each yarn spindle. Here, the packaging is to pack the whole pile of yarn spindles and print an information code on the outer packaging. If each yarn spindle is coded during the packaging process, the coding needs to be completed before going online. Otherwise, the accuracy of coding will be greatly reduced after the order of the yarn spindles changes after going online.

Therefore, how to improve the accuracy and efficiency of yarn spindle coding is a research topic in the production of chemical fiber products.

SUMMARY

The present disclosure provides a yarn spindle coding method and apparatus, an electronic device and a storage medium.

According to an aspect of the present disclosure, provided is a yarn spindle coding method, applied to a winding machine, including:
  in a case where it is determined that yarn spindles in the winding machine are fully wound, unloading and sleeving the yarn spindles in the winding machine sequentially outside a yarn connecting rod of a doffer, and updating the number of unloading times of the winding machine and recording first doffing time of each yarn spindle;
  generating a first information code of each yarn spindle respectively based on identification information of the winding machine, the updated number of unloading times of the winding machine, the first doffing time of each yarn spindle and position information of each yarn spindle in the winding machine; and
  sending each first information code to the doffer, where the first information code is used by the doffer to determine a corresponding target yarn spindle among the yarn spindles according to a matching degree between the first doffing time in the first information code and second doffing time of each yarn spindle recorded by the doffer and code the information code on an inner wall of a paper tube of the corresponding target yarn spindle.

According to another aspect of the present disclosure, provided is a yarn spindle coding method, applied to a doffer, including:
  in a case where yarn spindles in a winding machine are sequentially sleeved outside a yarn connecting rod of the doffer, recording second doffing time of each yarn spindle sleeved outside the yarn connecting rod;
  receiving a plurality of first information codes from the winding machine, where each first information code includes identification information of the winding machine, the number of unloading times of the winding machine, first doffing time of a yarn spindle corresponding to the first information code recorded by the winding machine, and position information of the yarn spindle in the winding machine;
  for any first information code, determining a target yarn spindle corresponding to the first information code among the yarn spindles sleeved outside the yarn connecting rod according to a matching degree between the first doffing time in the first information code and the second doffing time of each yarn spindle sleeved outside the yarn connecting rod; and
  coding the first information code on an inner wall of a paper tube of the target yarn spindle.

According to yet another aspect of the present disclosure, provided is a yarn spindle coding method, applied to a packaging machine, including:
  receiving a plurality of first information codes from a doffer, where each first information code includes identification information of a winding machine, the number of unloading times of the winding machine, first doffing time of a yarn spindle corresponding to the first information code recorded by the winding machine, and position information of the yarn spindle in the winding machine;
  determining a corresponding target production batch in a production batch set according to the identification information of the winding machine and the first doffing time in each first information code;
  determining a corresponding target stacking position based on the target production batch; and
  generating a moving instruction based on the target stacking position, where the moving instruction is used to instruct the doffer to move to the target stacking position and unload yarn spindles in the doffer at the target stacking position.

According to yet another aspect of the present disclosure, provided is a yarn spindle coding apparatus, applied to a winding machine, including:
  an unloading and recording module configured to, in a case where it is determined that yarn spindles in the winding machine are fully wound, unload and sleeve the yarn spindles in the winding machine sequentially outside a yarn connecting rod of a doffer, and update the number of unloading times of the winding machine and record first doffing time of each yarn spindle;
  a first information code generating module configured to generate a first information code of each yarn spindle respectively based on identification information of the winding machine, the updated number of unloading times of the winding machine, the first doffing time of each yarn spindle and position information of each yarn spindle in the winding machine; and a first information code sending module configured to send each first information code to the doffer, where the first information code is used by the doffer to determine a corresponding target yarn spindle among the yarn spindles according to a matching degree between the first doffing time in the first information code and second doffing time of each yarn spindle recorded by the doffer and code the information code on an inner wall of a paper tube of the corresponding target yarn spindle.

According to yet another aspect of the present disclosure, provided is a yarn spindle coding apparatus, applied to a doffer, including:

a doffing time recording module configured to, in a case where yarn spindles in a winding machine are sequentially sleeved outside a yarn connecting rod of the doffer, record second doffing time of each yarn spindle sleeved outside the yarn connecting rod;

a first information code receiving module configured to receive a plurality of first information codes from the winding machine, where each first information code includes identification information of the winding machine, the number of unloading times of the winding machine, first doffing time of a yarn spindle corresponding to the first information code recorded by the winding machine, and position information of the yarn spindle in the winding machine;

a target yarn spindle determining module configured to, for any first information code, determine a target yarn spindle corresponding to the first information code among the yarn spindles sleeved outside the yarn connecting rod according to a matching degree between the first doffing time in the first information code and the second doffing time of each yarn spindle sleeved outside the yarn connecting rod; and a first coding module configured to code the first information code on an inner wall of a paper tube of the target yarn spindle.

According to yet another aspect of the present disclosure, provided is a yarn spindle coding apparatus, including:

a second information code receiving module configured to receive a plurality of first information codes from a doffer, where each first information code includes identification information of a winding machine, the number of unloading times of the winding machine, first doffing time of a yarn spindle corresponding to the first information code recorded by the winding machine, and position information of the yarn spindle in the winding machine;

a batch determining module configured to determine a corresponding target production batch in a production batch set according to the identification information of the winding machine and the first doffing time in each first information code;

a stacking position determining module configured to determine a corresponding target stacking position based on the target production batch; and a moving instruction generating module configured to generate a moving instruction based on the target stacking position, where the moving instruction is used to instruct the doffer to move to the target stacking position and unload yarn spindles in the doffer at the target stacking position.

According to yet another aspect of the present disclosure, provided is an electronic device, including:

at least one processor; and a memory connected in communication with the at least one processor;

where the memory stores an instruction executable by the at least one processor, and the instruction, when executed by the at least one processor, enables the at least one processor to execute the yarn spindle coding method according to any one of the embodiments of the present disclosure.

According to yet another aspect of the present disclosure, provided is a non-transitory computer-readable storage medium storing a computer instruction thereon, and the computer instruction is used to cause a computer to execute the yarn spindle coding method according to any one of the embodiments of the present disclosure.

According to yet another aspect of the present disclosure, provided is a computer program product including a computer program, and the computer program implements the yarn spindle coding method according to any one of the embodiments of the present disclosure, when executed by a processor.

According to the technology in the present disclosure, when the yarn spindles in the winding machine are fully wound, the yarn spindles in the winding machine are sequentially unloaded and sleeved outside the yarn connecting rod of the doffer, and simultaneously the first information code of each yarn spindle is generated. Then, the first information code of each yarn spindle is sent to the doffer, so that the doffer codes each first information code on the inner wall of the paper tube of the corresponding yarn spindle. In this way, the doffer does not have to wait for the winding machine to code the yarn spindles, and the doffer can code the yarn spindles during the process of transporting the yarn spindles, thereby improving the overall efficiency of production and transportation of the yarn spindles. Furthermore, the first information code includes the first doffing time. The doffer can determine the corresponding target yarn spindle among the yarn spindles according to the matching degree between the first doffing time and the second doffing time of each yarn spindle recorded by the doffer, and then code the first information code on the inner wall of the paper tube of the target yarn spindle. In this way, the information code of the yarn spindle can be accurately coded on the corresponding yarn spindle. Therefore, the technology in the present disclosure can not only improve the production and transportation efficiency of yarn spindles, but also code the information codes of the yarn spindles on the corresponding yarn spindles accurately.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

The accompanying drawings are used to better understand the present solution, and do not constitute a limitation to the present disclosure.

DETAILED DESCRIPTION

Hereinafter, descriptions to exemplary embodiments of the present disclosure are made with reference to the accompanying drawings, include various details of the embodiments of the present disclosure to facilitate understanding, and should be considered as merely exemplary. Therefore, those having ordinary skill in the art should realize, various changes and modifications may be made to the embodiments described herein, without departing from the scope of the present disclosure. Likewise, for clarity and conciseness, descriptions of well-known functions and structures are omitted in the following descriptions.

Figure 1:
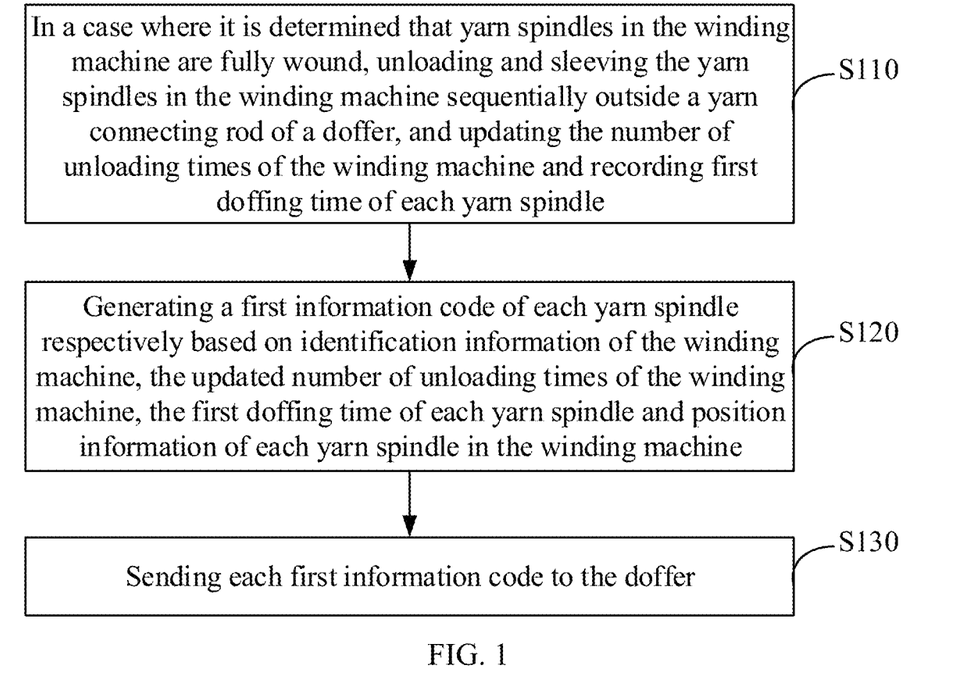
FIG. 1 is a flow chart of a yarn spindle coding method according to an embodiment of the present disclosure.

FIG. 1 is a flow chart of a yarn spindle coding method according to an embodiment of the present disclosure.

As shown in FIG. 1, the yarn spindle coding method may be applied to a winding machine, and may specifically include:

S110: in a case where it is determined that yarn spindles in the winding machine are fully wound, unloading and sleeving the yarn spindles in the winding machine sequentially outside a yarn connecting rod of a doffer, and updating the number of unloading times of the winding machine and recording first doffing time of each yarn spindle;

S120: generating a first information code of each yarn spindle respectively based on identification information of the winding machine, the updated number of unloading times of the winding machine, the first doffing time of each yarn spindle and position information of each yarn spindle in the winding machine; and S130: sending each first information code to the doffer, where the first information code is used by the doffer to determine a corresponding target yarn spindle among the yarn spindles according to a matching degree between the first doffing time in the first information code and second doffing time of each yarn spindle recorded by the doffer and code the information code on an inner wall of a paper tube of the corresponding target yarn spindle.

In practical applications, the winding machine is provided with a reel, and there are a plurality of yarn spindles in the reel. After the yarn spindles in the reel have been wound, one end of the yarn connecting rod of the doffer is aligned with the discharge port of the reel, and the yarn spindles in the reel can be sequentially unloaded and sleeved outside the yarn connecting rod.

It can be understood that the doffer may include one yarn connecting rod. Alternatively, the doffer may include a plurality of yarn connecting rods to transport a plurality of yarn spindles.

It can be understood that, by timing the winding time of the yarn spindle, if the winding time reaches a set time threshold, it is considered that the yarn spindles are fully wound. Alternatively, the yarn spindles are weighed at a set frequency. If the weight of the yarn spindles reaches a set weight threshold, it is considered that the yarn spindles are fully wound.

It can be understood that the winding machine updates the number of unloading times every time the winding machine unloads one yarn spindle. Therefore, the number of unloading times can also be called the number of drops. Each time the number of unloading times is updated, the value of the number of unloading times may be increased by 1.

It can be understood that each yarn spindle has the first doffing time and second doffing time, where the first doffing time is the time recorded by the winding machine when the yarn spindle is unloaded from the doffer. The second doffing time is the time recorded by the doffer when the yarn spindle is unloaded from the doffer.

It can be understood that the identification information of the winding machine may be the machine position number, model, manufacturer, etc. of the winding machine.

It can be understood that the position information of the yarn spindle in the winding machine may be the spindle position number of the yarn spindle in the winding machine. For example, the reel of the winding machine includes a plurality of yarn spindles arranged concentrically with the reel axis, and then the position of each yarn spindle in the reel is different. The arrangement position of the yarn spindle in the reel can be used to determine the spindle position number of the yarn spindle in the winding machine.

It can be understood that the first information code may be a QR code or a bar code, etc.

It can be understood that the step of generating the first information code of each yarn spindle respectively based on the identification information of the winding machine, the updated number of unloading times of the winding machine, the first doffing time of each yarn spindle and the position information of each yarn spindle in the winding machine, includes: using a preset encoding algorithm to encode the identification information of the winding machine, the updated number of unloading times of the winding machine, the first doffing time of each yarn spindle and the position information of the yarn spindle in the winding machine, to obtain the first information code of the yarn spindle.

For example, the numerical information such as the number of unloading times of the winding machine and the first doffing time of the yarn spindle are encoded according to the numerical encoding method.

For another example, the text information such as the identification information of the winding machine and the position information of the yarn spindle in the winding machine are encoded according to the text encoding method.

Therefore, the first information code includes the identification information of the winding machine, the number of unloading times of the winding machine, the first doffing time of the yarn spindle, and the position information of the yarn spindle in the winding machine.

It can be understood that sending each first information code to the doffer may include: sending the corresponding first information code to the doffer sequentially based on the first doffing time in each first information code. Therefore, the first information codes may be sent sequentially in the chronological order of the first doffing times in the first information codes.

In practical applications, when a yarn spindle undergoes quality inspection before leaving the factory or when a product has a problem after leaving the factory, the first information code can be used to find the production information of the yarn spindle, such as the information of the winding machine that produces the yarn spindle, the production time of the yarn spindle (the doffing time is close to the production time, and the doffing time can represent the production time), and the position information of the yarn spindle in the winding machine (for example, it can be used to find out whether there is a problem with the winding mechanism corresponding to this position), so as to find out the cause of the problem with the yarn spindle.

In the embodiment of the present disclosure, since the first information code includes the information of the winding machine and the position information of the yarn spindle in the winding machine, the first information code is generated by the winding machine, thus improving the generation efficiency of the first information code. On the other hand, the winding machine sends the first information code to the doffer, so that the doffer can code the yarn spindles during transportation. There is no need for the doffer to wait for the winding machine to code the yarn spindles, reducing the waiting time of the doffer and also the total time for production and transportation of the yarn spindles, and improving the efficiency of production and transportation of the yarn spindles.

Furthermore, the first information code includes the first doffing time. The doffer can determine the corresponding target yarn spindle among the yarn spindles according to the matching degree between the first doffing time and the second doffing time of each yarn spindle recorded by the doffer, and then code the first information code on the inner wall of the paper tube of the target yarn spindle. In this way, the information code of the yarn spindle can be accurately coded on the corresponding yarn spindle.

Therefore, the embodiment of the present disclosure can not only improve the production and transportation efficiency of yarn spindles, but also code the information codes of the yarn spindles on the corresponding yarn spindles accurately.

In an implementation, the above method may further include: obtaining identification information of the doffer; and the step of generating the first information code of each yarn spindle respectively based on the identification information of the winding machine, the updated number of unloading times of the winding machine, the first doffing time of each yarn spindle and the position information of each yarn spindle in the winding machine, includes: for each yarn spindle, generating the first information code of the yarn spindle respectively based on the identification information of the doffer, the identification information of the winding machine, the updated number of unloading times of the winding machine, the first doffing time of the yarn spindle and the position information of the yarn spindle in the winding machine, to obtain the first information code of each yarn spindle.

It can be understood that, in a case where one end of the yarn connecting rod of the doffer is aligned with the discharge port of the winding machine, the information code identifier of the doffer is displayed toward the winding machine, and the winding machine can use a camera to shoot the information code identifier of the doffer to obtain the identification information of the doffer.

It can be understood that the identification information of the doffer includes the machine position number, model information, manufacturer, etc. of the doffer.

It can be understood that the first information code may also include the identification information of the doffer.

It can be understood that the preset coding algorithm is used to encode the identification information of the doffer, the identification information of the winding machine, the updated unloading times of the winding machine, the first doffing time of the yarn spindle and the position information of the yarn spindle in the winding machine, to obtain the first information code of the yarn spindle.

For example, the numerical information such as the number of unloading times of the winding machine and the first doffing time of the yarn spindle are encoded according to the numerical encoding method.

For another example, the text information such as the identification information of the doffer, the identification information of the winding machine and the position information of the yarn spindle in the winding machine are encoded according to the text encoding method.

In practical applications, when a yarn spindle undergoes quality inspection before leaving the factory or when a product has a problem after leaving the factory, the first information code can be used to find the transport information of the yarn spindle such as the doffer transporting the yarn spindle, for example, find out if there is a problem in the transportation process of the yarn spindle due to a problem with the doffer.

According to the above implementation, the first information code of the yarn spindle is generated in combination with the identification information of the doffer, so that not only the production information of the yarn spindle can be traced back, but also the information of the doffer transporting the yarn spindle can be traced back, when there is a quality problem with the yarn spindle product.

In an implementation, the above method may further include: controlling a timer to record winding time from 0 in a case where fiber yarns are used to wind a paper tube in the winding machine to form yarn spindles; and determining that the yarn spindles in the winding machine are fully wound in a case where the winding time reaches a set time threshold.

According to the above implementation, by timing the winding time of the yarn spindle, it can be considered that the yarn spindles are fully wound when the set time is reached.

In an implementation, the above method may further include: determining that the yarn spindles in the winding machine are fully wound in a case where the weight of each yarn spindle in the winding machine reaches a set weight threshold.

It can be understood that the yarn spindles are weighed at a set frequency.

According to the above implementation, by weighing the yarn spindles, it can be considered that the yarn spindles are fully wound when the weight of the yarn spindles reaches the set threshold.

Figure 2:
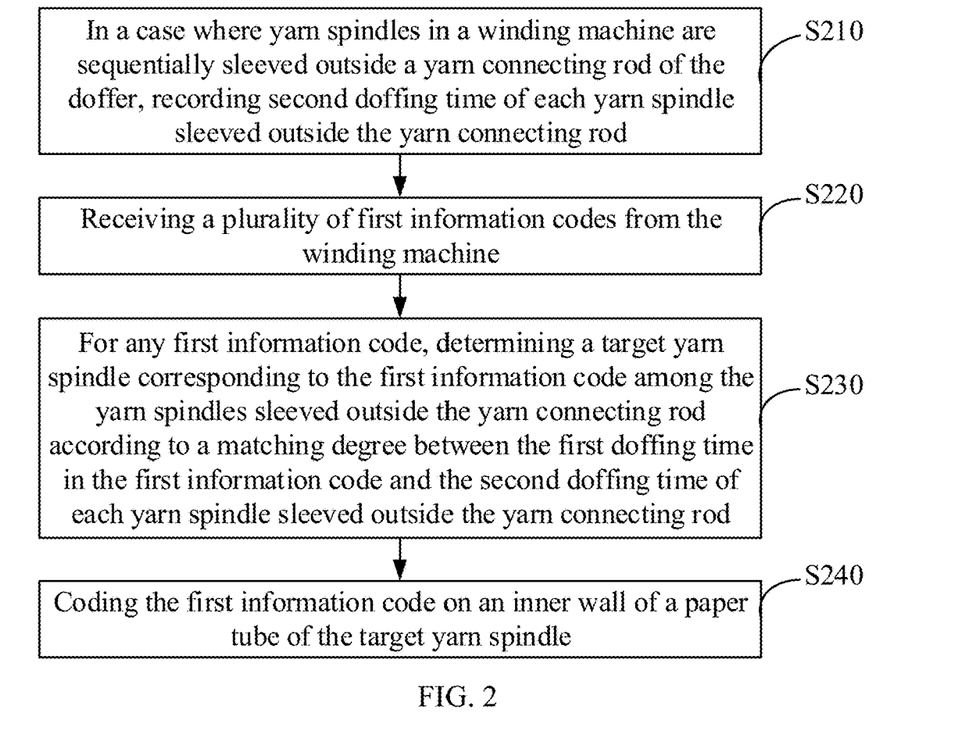
FIG. 2 is a flow chart of a yarn spindle coding method according to another embodiment of the present disclosure.

FIG. 2 is a flow chart of a yarn spindle coding method according to another embodiment of the present disclosure.

As shown in FIG. 2, the yarn spindle coding method may be applied to a doffer, and may specifically include:

S210: in a case where yarn spindles in a winding machine are sequentially sleeved outside a yarn connecting rod of the doffer, recording second doffing time of each yarn spindle sleeved outside the yarn connecting rod;

S220: receiving a plurality of first information codes from the winding machine, where each first information code includes identification information of a winding machine, the number of unloading times of the winding machine, first doffing time of a yarn spindle corresponding to the first information code recorded by the winding machine, and position information of the yarn spindle in the winding machine;

S230: for any first information code, determining a target yarn spindle corresponding to the first information code among the yarn spindles sleeved outside the yarn connecting rod according to a matching degree between the first doffing time in the first information code and the second doffing time of each yarn spindle sleeved outside the yarn connecting rod; and S240: coding the first information code on an inner wall of a paper tube of the target yarn spindle.

It can be understood that the winding machine and the doffer respectively record the doffing time of the same yarn spindle to obtain the first doffing time and the second doffing time. The first doffing time and the second doffing time may be the same or different. When the time difference between the first doffing time and the second doffing time is less than a set threshold, it can be considered that them are recorded as the doffing time of the same yarn spindle.

It can be understood that the matching degree between the first doffing time in the first information code and the second doffing time of each yarn spindle sleeved outside the yarn connecting rod is respectively determined based on the time difference between the first doffing time in the first information code and the second doffing time of each yarn spindle sleeved outside the yarn connecting rod.

For example, the greater the time difference, the lower the matching degree; the less the time difference, the higher the matching degree.

It can be understood that the yarn spindle with the highest matching degree between the second doffing time and the first doffing time in the first information code is selected from the yarn spindles sleeved outside the yarn connecting rod, as the target yarn spindle corresponding to the first information code.

It can be understood that one first information code corresponds to one target yarn spindle. In this way, each first information is coded on the inner wall of the paper tube of the corresponding target yarn spindle.

It can be understood that the doffer can receive a plurality of first information codes from the winding machine at one time, or can receive the first information codes from the winding machine one by one to obtain a plurality of first information codes.

In another example, if the doffer receives the first information codes from the winding machine one by one, the yarn spindle arranged in the same order as the receiving order and sleeved outside the yarn connecting rod of the doffer can be determined, and a yarn spindle set is determined based on the yarn spindles near this yarn spindle. Thus, the second doffing time of each yarn spindle in the yarn spindle set is obtained, and each second doffing time is matched with the first doffing time in the first information code. If the matching succeeds, the yarn spindle corresponding to the second doffing time is considered to be the target yarn spindle.

According to the above implementation, the doffer receives the first information code, and matches the first doffing time in the first information code with the second doffing time of each yarn spindle recorded by the doffer to accurately determine the target yarn spindle corresponding to the first information code, thereby coding the first information code on the inner wall of the yarn tube of the target yarn spindle.

In an implementation, the above method may further include: sending the first information code received by the doffer to a packaging machine in a case where the doffer stops sleeveing yarn spindles outside the yarn connecting rod of the doffer and the corresponding first information code has been coded on an inner wall of a paper tube of each yarn spindle sleeved outside the yarn connecting rod; where the first information code is used by the packaging machine to determine a target production batch according to the identification information of the winding machine and the first doffing time in each first information code; the target production batch is used to determine a corresponding target stacking position; and the target stacking position is used to generate a moving instruction; receiving the moving instruction from the packaging machine; and controlling the doffer to move to the target stacking position and unload yarn spindles in the doffer at the target stacking position in response to the moving instruction.

It can be understood that the doffer stores the received first information codes in a preset storage space. Then, in the case where the doffer stops sleeveing yarn spindles outside the yarn connecting rod of the doffer and the corresponding first information code has been coded on the inner wall of the paper tube of each yarn spindle sleeved outside the yarn connecting rod, all the first information codes in the storage space are sent to the packaging machine, and the storage space is cleared.

In practical applications, the winding machine produces a batch of yarn spindles in batches within a period of time. During this period, the yarn spindles transported by the doffer for transporting the yarn spindles produced by the winding machine all belong to the same batch. By clearing the storage space storing the first information codes in the above manner, it can be ensured that the yarn spindles represented by the first information codes sent to the packaging machine all belong to the same batch.

It can be understood that, after receiving the first information code, the packaging machine can determine the corresponding target production batch according to the identification information of the winding machine and the first doffing time in the first information code.

For example, the first production batch set is set to include a plurality of production batches, and the second production batch set is an empty set. The first doffing time is matched with the production time corresponding to each production batch in the first production batch set. If the first doffing time falls into the production time corresponding to a certain production batch, this production batch is added to the second production batch set. Then, the identification information of the winding machine in the first information code is matched with the identification information set of winding machines corresponding to each production batch in the second production batch set. If the identification information of the winding machine in the first information code falls into the identification information set of winding machines corresponding to a certain production batch, this production batch is taken as the target production batch. Here, the identification information set of winding machines includes multiple pieces of identification information, and each piece of identification information is used to identify the identity of the corresponding winding machine.

For another example, the first production batch set is set to include a plurality of production batches, and the second production batch set is an empty set. The identification information of the winding machine in the first information code is matched with the identification information set of winding machines corresponding to each production batch in the first production batch set. If the identification information of the winding machine in the first information code falls into the identification information set of winding machines corresponding to a certain production batch, this production batch is added to the second production batch set. Then, the first doffing information is matched with the production time corresponding to each production batch in the second production batch set. If the first doffing time falls into the production time corresponding to a certain production batch, this production batch is taken as the target production batch.

It can be understood that each production batch corresponds to one or more stacking positions. One stacking position corresponds to one production batch.

It can be understood that the moving instruction includes a target stacking position. In this way, when the doffer receives the moving instruction, the doffer can move to the target stacking position indicated in the moving instruction and then unload the yarn spindles in the doffer at the target stacking position in response to the moving instruction.

According to the above implementation, the doffer sends the first information code to the packaging machine, and the packaging machine can determine the corresponding target production batch according to the first doffing time and the identification information of the winding machine in the first information code to thereby determine the target stacking position corresponding to this batch, and use this position to generate and return the moving instruction to the doffer. Thus, the doffer can move to the target stacking position according to the target stacking position indicated in the moving instruction returned from the packaging machine, and then unload the yarn spindles in the doffer at this position.

Figure 3:
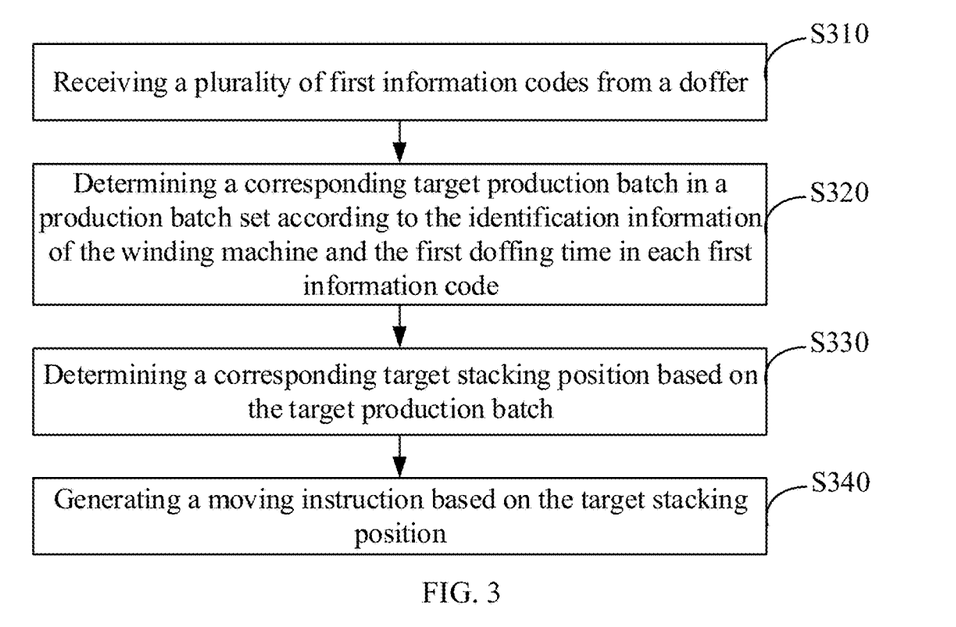
FIG. 3 is a flow chart of a yarn spindle coding method according to yet another embodiment of the present disclosure.

FIG. 3 is a flow chart of a yarn spindle coding method according to an embodiment of the present disclosure.

As shown in FIG. 3, the yarn spindle coding method may be applied to a packaging machine, and the method may include:

S310: receiving a plurality of first information codes from a doffer, where each first information code includes identification information of a winding machine, the number of unloading times of the winding machine, first doffing time of a yarn spindle corresponding to the first information code recorded by the winding machine, and position information of the yarn spindle in the winding machine;

S320: determining a corresponding target production batch in a production batch set according to the identification information of the winding machine and the first doffing time in each first information code;

S330: determining a corresponding target stacking position based on the target production batch; and S340: generating a moving instruction based on the target stacking position, where the moving instruction is used to instruct the doffer to move to the target stacking position and unload yarn spindles in the doffer at the target stacking position.

It can be understood that the identification information of the winding machine in each first information code may be the same or different.

It can be understood that the first doffing times in the plurality of first information codes may fall into the same time period or may fall into different time periods.

It can be understood that the target production batches corresponding to the first information codes are respectively determined in the production batch set based on the identification information of the winding machine and the first doffing time in the first information codes, and then the determined target production batches are deduplicated. The target production batch obtained after deduplication may include one or more batches.

It can be understood that the process of determining the target production batch corresponding to each first information code may be as follows:

For example, the first production batch set is set to include a plurality of production batches, and the second production batch set is an empty set. The first doffing time is matched with the production time corresponding to each production batch in the first production batch set. If the first doffing time falls into the production time corresponding to a certain production batch, this production batch is added to the second production batch set. Then, the identification information of the winding machine in the first information code is matched with the identification information set of winding machines corresponding to each production batch in the second production batch set. If the identification information of the winding machine in the first information code falls into the identification information set of winding machines corresponding to a certain production batch, this production batch is taken as the target production batch. Here, the identification information set of winding machines includes multiple pieces of identification information, and each piece of identification information is used to identify the identity of the corresponding winding machine.

For another example, the first production batch set is set to include a plurality of production batches, and the second production batch set is an empty set. The identification information of the winding machine in the first information code is matched with the identification information set of winding machines corresponding to each production batch in the first production batch set. If the identification information of the winding machine in the first information code falls into the identification information set of winding machines corresponding to a certain production batch, this production batch is added to the second production batch set. Then, the first doffing information is matched with the production time corresponding to each production batch in the second production batch set. If the first doffing time falls into the production time corresponding to a certain production batch, this production batch is taken as the target production batch.

It can be understood that each production batch corresponds to one or more stacking positions. If it is determined that a plurality of target stacking positions are obtained, a stacking position that is not fully stacked with yarn spindles is selected as the final target stacking position. Then, the moving instruction is generated using the final target stacking position.

According to the above implementation, the packaging machine receives the first information code, determines the corresponding production batch according to the first information code to thereby determine the corresponding target stacking position, and generates the moving instruction using this position. In this way, the moving instruction is sent to the doffer, and can instruct the doffer to move to the position indicated by the instruction and unload the yarn spindles at the position.

In an implementation, the above method may further include: obtaining corresponding product specification information based on the target production batch; generating a second information code based on the target production batch and the product specification information; packaging the yarn spindles at the target stacking position to obtain a packaged yarn spindle product in a case where the number or weight of the yarn spindles at the target stacking position meets a set condition; and coding the second information code on an outer surface of the yarn spindle product.

It can be understood that each batch corresponds to different product specification information. Alternatively, one or more batches correspond to the same product specification information.

It can be understood that the product specification information may include information such as the size, material and weight of the yarn spindle.

It can be understood that the target production batch and product specification information are encoded to obtain the second information code. Here, the second information code may be a QR code or a bar code, etc. Thus, the second information code includes information such as the target production batch and product specification information.

It can be understood that, in a case where the same batch corresponds to a plurality of stacking positions, the plurality of stacking positions correspond to one serial number respectively. Therefore, if the target stacking position has a corresponding serial number, the serial number, the target generation batch and the product specification information can be encoded to obtain the second information code.

In actual applications, after a yarn spindle product is shipped to a customer, the customer scans the second information code on the outer surface of the yarn spindle product to obtain the production batch information and product specification information of the yarn spindle product.

It can be understood that the yarn spindle product includes a plurality of yarn spindles.

According to the above implementation, the packaging machine generates the second information code according to the production batch and product specification information, and codes the second information code on the outer surface of the packaged yarn spindle product. In this way, after the yarn spindle product is shipped to the customer, the customer scans the second information code on the outer surface of the yarn spindle product to obtain the production batch information and product specification information of the yarn spindle product.

Figure 4:
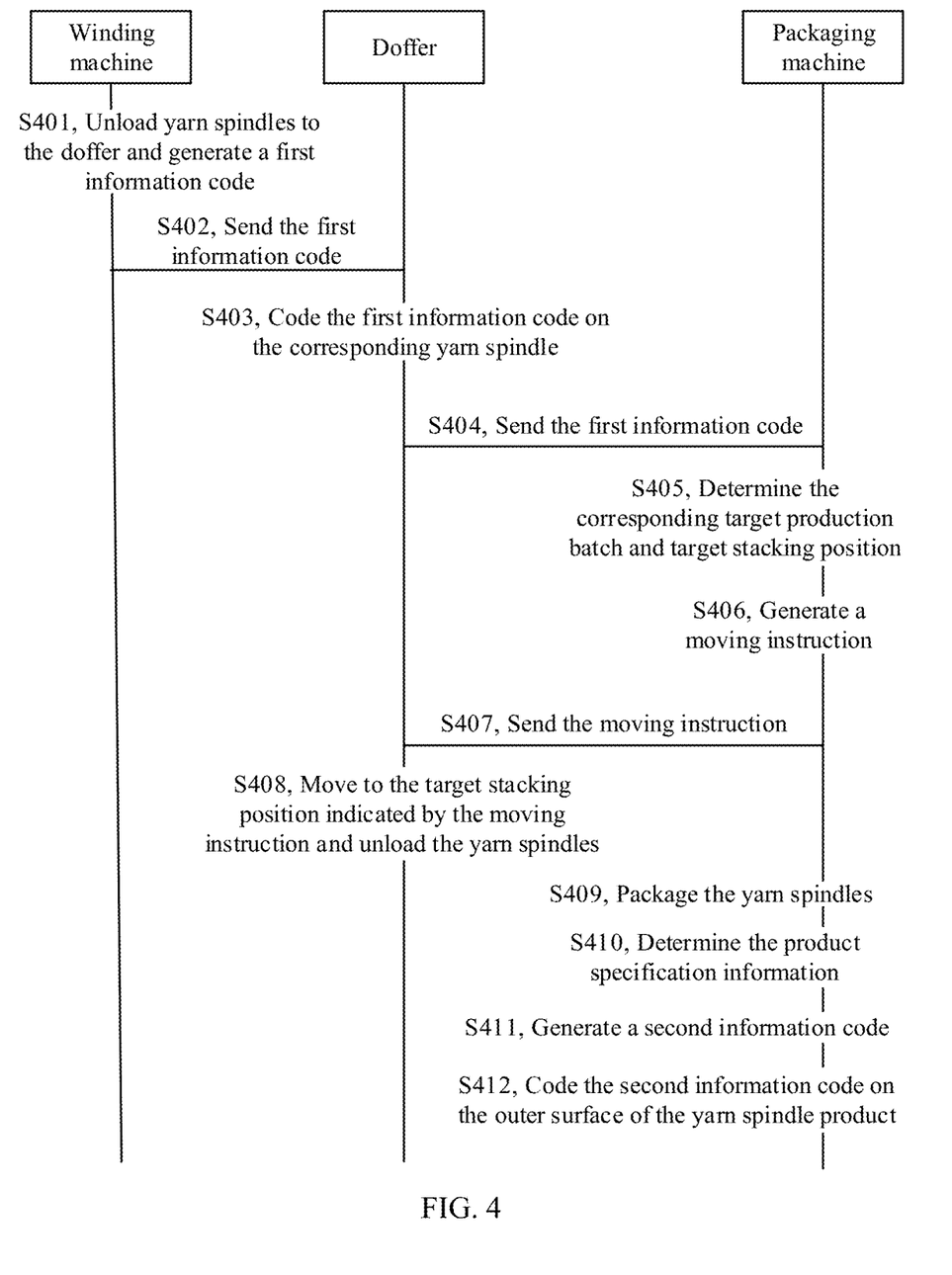
FIG. 4 is a flow chart of a yarn spindle coding method according to yet another embodiment of the present disclosure.

FIG. 4 is a flow chart of a yarn spindle coding method according to an embodiment of the present disclosure.

As shown in FIG. 4, the method may include the following steps:

S401: a winding machine unloads yarn spindles to a doffer and generates a first information code. Here, the first information code includes the identification information of the winding machine, the number of unloading times of the winding machine, the first doffing time of each yarn spindle, and the position information of each yarn spindle in the winding machine.

S402: the winding machine sends the first information code to the doffer.

S403: the doffer codes the first information code on the inner wall of the paper tube of the corresponding yarn spindle.

S404: the doffer sends the first information code to a packaging machine.

S405: the packaging machine determines the corresponding target production batch according to the first information code, and determines the corresponding target stacking position according to the target production batch.

S406: the packaging machine generates a moving instruction based on the target stacking position.

S407: the packaging machine sends the moving instruction to the doffer.

S408: the doffer moves to the target stacking position indicated by the moving instruction and unloads the yarn spindles at the target stacking position in response to the moving instruction.

S409: the packaging machine packages the yarn spindles at the target stacking position to obtain a yarn spindle product.

S410: the packaging machine determines the corresponding product specification information based on the target production batch.

S411: the packaging machine generates a second information code based on the target production batch and product specification information.

S412: the packaging machine codes the second information code on the outer surface of the yarn spindle product.

According to the above implementation, the yarn spindle product and each yarn spindle in the yarn spindle product can be coded with information codes respectively, and the coding process does not affect the production and transportation of the yarn spindles, thus improving the efficiency of production and transportation of the yarn spindles.

Figure 5:
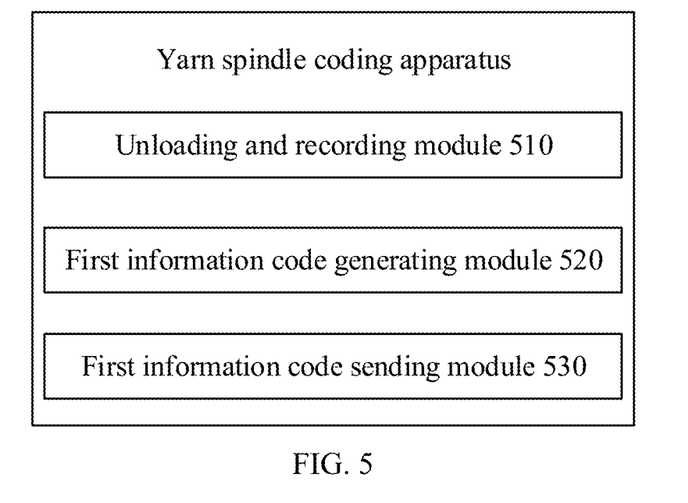
FIG. 5 is a structural block diagram of a yarn spindle coding apparatus according to an embodiment of the present disclosure.

FIG. 5 is a structural block diagram of a yarn spindle coding apparatus according to an embodiment of the present disclosure.

As shown in FIG. 5, the yarn spindle coding apparatus may be applied to a winding machine, and may specifically include:

an unloading and recording module 510 configured to, in a case where it is determined that yarn spindles in the winding machine are fully wound, unload and sleeve the yarn spindles in the winding machine sequentially outside a yarn connecting rod of a doffer, and update the number of unloading times of the winding machine and record first doffing time of each yarn spindle;

a first information code generating module 520 configured to generate a first information code of each yarn spindle respectively based on identification information of the winding machine, the updated number of unloading times of the winding machine, the first doffing time of each yarn spindle and position information of each yarn spindle in the winding machine; and a first information code sending module 530 configured to send each first information code to the doffer, where the first information code is used by the doffer to determine a corresponding target yarn spindle among the yarn spindles according to a matching degree between the first doffing time in the first information code and second doffing time of each yarn spindle recorded by the doffer and code the information code on an inner wall of a paper tube of the corresponding target yarn spindle.

In an implementation, the above apparatus may further include:

an identification information obtaining module configured to obtain identification information of the doffer;

the first information code generating module 520 is specifically configured to:

for each yarn spindle, generate the first information code of the yarn spindle respectively based on the identification information of the doffer, the identification information of the winding machine, the updated number of unloading times of the winding machine, the first doffing time of the yarn spindle and the position information of the yarn spindle in the winding machine, to obtain the first information code of each yarn spindle.

In an implementation, the above apparatus may further include:
- a winding time recording module configured to control a timer to record winding time from 0 in a case where fiber yarns are used to wind a paper tube in the winding machine to form yarn spindles; and
- a first full-wind determining module configured to determine that the yarn spindles in the winding machine are fully wound in a case where the winding time reaches a set time threshold.

In an implementation, the above apparatus may further include:
- a second full-wind determining module configured to determine that the yarn spindles in the winding machine are fully wound in a case where weight of each yarn spindle in the winding machine reaches a set weight threshold.

In an information, the first information code is a QR code or a bar code.

Figure 6:
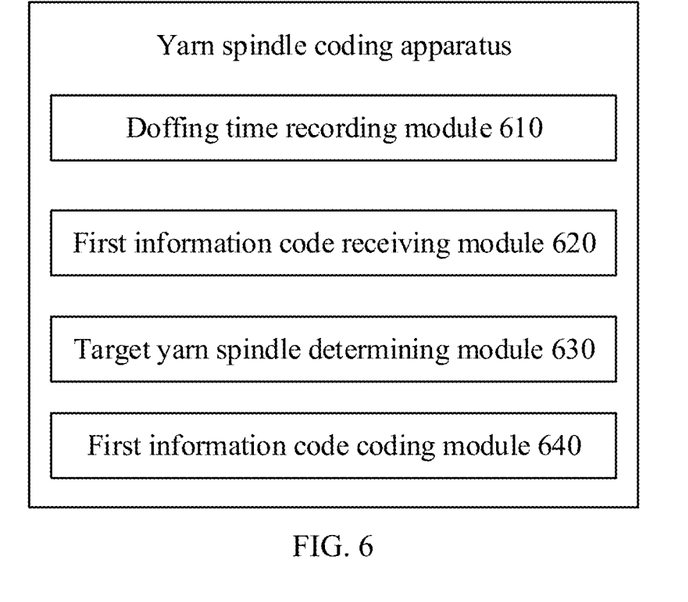
FIG. 6 is a structural block diagram of a yarn spindle coding apparatus according to another embodiment of the present disclosure.

FIG. 6 is a structural block diagram of a yarn spindle coding apparatus according to an embodiment of the present disclosure.

As shown in FIG. 6, the yarn spindle coding apparatus may be applied to a doffer, and the apparatus includes:
- a doffing time recording module 610 configured to, in a case where yarn spindles in a winding machine are sequentially sleeved outside a yarn connecting rod of the doffer, record second doffing time of each yarn spindle sleeved outside the yarn connecting rod;
- a first information code receiving module 620 configured to receive a plurality of first information codes from the winding machine, where each first information code includes identification information of the winding machine, the number of unloading times of the winding machine, first doffing time of a yarn spindle corresponding to the first information code recorded by the winding machine, and position information of the yarn spindle in the winding machine;
- a target yarn spindle determining module 630 configured to, for any first information code, determine a target yarn spindle corresponding to the first information code among the yarn spindles sleeved outside the yarn connecting rod according to a matching degree between the first doffing time in the first information code and the second doffing time of each yarn spindle sleeved outside the yarn connecting rod; and
- a first information code coding module 640 configured to code the first information code on an inner wall of a paper tube of the target yarn spindle.

In an implementation, the above apparatus may further include:
- a second information code sending module configured to send the first information code received by the doffer to a packaging machine in a case where the doffer stops sleeveing yarn spindles outside the yarn connecting rod of the doffer and the corresponding first information code has been coded on an inner wall of a paper tube of each yarn spindle sleeved outside the yarn connecting rod; where the first information code is used by the packaging machine to determine a target production batch according to the identification information of the winding machine and the first doffing time in each first information code; the target production batch is used to determine a corresponding target stacking position; and the target stacking position is used to generate a moving instruction;
- a moving instruction receiving module configured to receive the moving instruction from the packaging machine; and
- a doffer moving module configured to control the doffer to move to the target stacking position and unload yarn spindles in the doffer at the target stacking position in response to the moving instruction.

Figure 7:
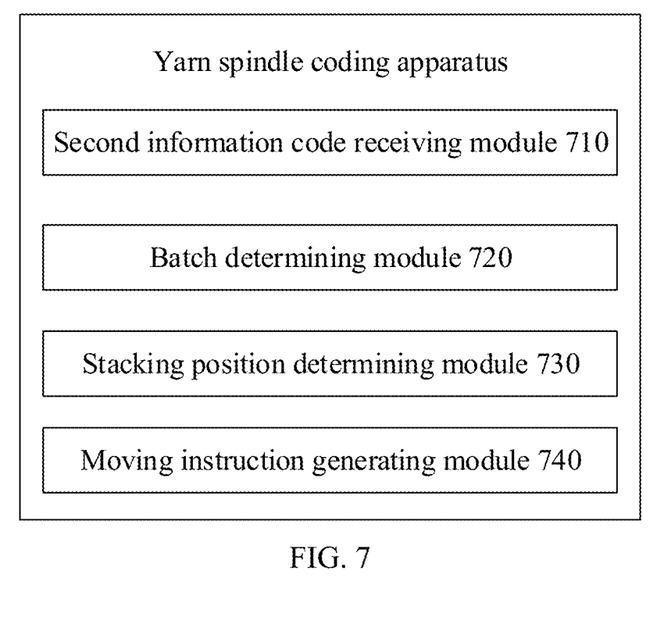
FIG. 7 is a structural block diagram of a yarn spindle coding apparatus according to yet another embodiment of the present disclosure.

FIG. 7 is a structural block diagram of a yarn spindle coding apparatus according to an embodiment of the present disclosure.

As shown in FIG. 7, the yarn spindle coding apparatus may be applied to a packaging machine, and the apparatus includes:
- a second information code receiving module 710 configured to receive a plurality of first information codes from a doffer, where each first information code includes identification information of a winding machine, the number of unloading times of the winding machine, first doffing time of a yarn spindle corresponding to the first information code recorded by the winding machine, and position information of the yarn spindle in the winding machine;
- a batch determining module 720 configured to determine a corresponding target production batch in a production batch set according to the identification information of the winding machine and the first doffing time in each first information code;
- a stacking position determining module 730 configured to determine a corresponding target stacking position based on the target production batch; and
- a moving instruction generating module 740 configured to generate a moving instruction based on the target stacking position, where the moving instruction is used to instruct the doffer to move to the target stacking position and unload yarn spindles in the doffer at the target stacking position.

In an implementation, the above apparatus may further include:
- a product specification obtaining module configured to obtain corresponding product specification information based on the target production batch;
- a second information code generating module configured to generate a second information code based on the target production batch and the product specification information;
- a yarn spindle packaging module configured to package the yarn spindles at the target stacking position to obtain a packaged yarn spindle product in a case where the number or weight of the yarn spindles at the target stacking position meets a set condition; and
- a second information code coding module configured to code the second information code on an outer surface of the yarn spindle product.

In an implementation, the second information code is a QR code or a bar code.

For the description of specific functions and examples of the modules and sub-modules of the apparatus of the embodiment of the present disclosure, reference may be made to the relevant description of the corresponding steps in the above-mentioned method embodiments, and details are not repeated here.

In the technical solution of the present disclosure, the acquisition, storage and application of the user's personal information involved are in compliance with relevant laws and regulations, and do not violate public order and good customs.

According to the embodiments of the present disclosure, the present disclosure also provides an electronic device, a readable storage medium and a computer program product.

Figure 8:
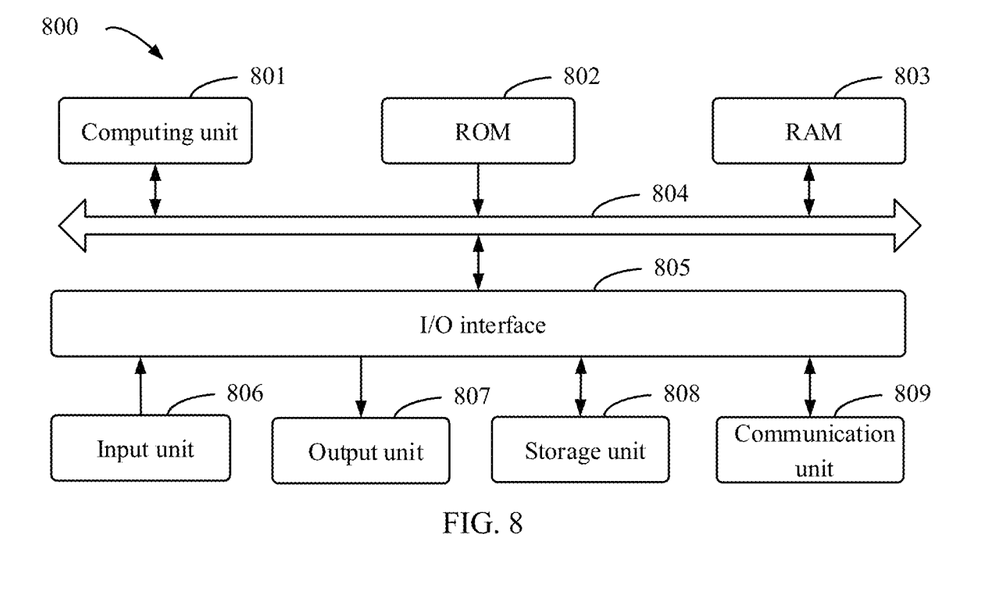
FIG. 8 is a block diagram of an electronic device according to an embodiment of the present disclosure.

FIG. 8 shows a schematic block diagram of an exemplary electronic device 800 that may be used to implement the embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital assistant, a cellular phone, a smart phone, a wearable device and other similar computing devices. The components shown herein, their connections and relationships, and their functions are merely examples, and are not intended to limit the implementation of the present disclosure described and/or required herein.

As shown in FIG. 8, the device 800 includes a computing unit 801 that may perform various appropriate actions and processes according to a computer program stored in a Read-Only Memory (ROM) 802 or a computer program loaded from a storage unit 808 into a Random Access Memory (RAM) 803. Various programs and data required for an operation of device 800 may also be stored in the RAM 803. The computing unit 801, the ROM 802 and the RAM 803 are connected to each other through a bus 804. The input/output (I/O) interface 805 is also connected to the bus 804.

A plurality of components in the device 800 are connected to the I/O interface 805, and include an input unit 806 such as a keyboard, a mouse, or the like; an output unit 807 such as various types of displays, speakers, or the like; the storage unit 808 such as a magnetic disk, an optical disk, or the like; and a communication unit 809 such as a network card, a modem, a wireless communication transceiver, or the like. The communication unit 809 allows the device 800 to exchange information/data with other devices through a computer network such as the Internet and/or various telecommunication networks.

The computing unit 801 may be various general-purpose and/or special-purpose processing components with processing and computing capabilities. Some examples of the computing unit 801 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 801 performs the various methods and processes described above, such as the yarn spindle coding method. For example, in some implementations, the yarn spindle coding method may be implemented as a computer software program tangibly contained in a computer-readable medium, such as the storage unit 808. In some implementations, a part or all of the computer program may be loaded and/or installed on the device 800 via the ROM 802 and/or the communication unit 809. When the computer program is loaded into the RAM 803 and executed by the computing unit 801, one or more steps of the yarn spindle coding method described above may be performed. Alternatively, in other implementations, the computing unit 801 may be configured to perform the yarn spindle coding method by any other suitable means (e.g., by means of firmware).

Various implementations of the system and technologies described above herein may be implemented in a digital electronic circuit system, an integrated circuit system, a Field Programmable Gate Array (FPGA), an Application Specific Integrated Circuit (ASIC), an Application Specific Standard Product (ASSP), a System on Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other programmable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, a Random Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display apparatus (e.g., a cathode ray tube (CRT) or a Liquid Crystal Display (LCD) monitor) for displaying information to the user; and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, or in a computing system (which serves as, for example, an application server) including a middleware, or in a computing system including a front-end component (e.g., a user computer with a graphical user interface or web browser through which the user may interact with the implementation of the system and technologies described herein), or in a computing system including any combination of the backend component, the middleware component, or the front-end component. The components of the system may be connected to each other through any form or kind of digital data communication (e.g., a communication network). Examples of the communication network include a Local Area Network (LAN), a Wide Area Network (WAN), and the Internet.

A computer system may include a client and a server. The client and server are generally far away from each other and usually interact with each other through a communication network. A relationship between the client and the server is generated by computer programs running on corresponding computers and having a client-server relationship with each other. The server may be a cloud server, a distributed system server, or a blockchain server.

It should be understood that, the steps may be reordered, added or removed by using the various forms of the flows described above. For example, the steps recorded in the present disclosure can be performed in parallel, in sequence, or in different orders, as long as a desired result of the technical scheme disclosed in the present disclosure can be realized, which is not limited herein.

The foregoing specific implementations do not constitute a limitation on the protection scope of the present disclosure. Those having ordinary skill in the art should understand that, various modifications, combinations, sub-combinations and substitutions may be made according to a design requirement and other factors. Any modification, equivalent replacement, improvement or the like made within the principle of the present disclosure shall be included in the protection scope of the present disclosure.

What is claimed is:

1. A yarn spindle coding method, comprising:
    unloading and sleeving, by a winding machine, yarn spindles in the winding machine sequentially outside a yarn connecting rod of a doffer and updating a number of unloading times of the winding machine and recording first doffing time of each yarn spindle, responsive to determining that the yarn spindles in the winding machine are fully wound;
    generating, by the winding machine, a first information code of each yarn spindle respectively based on identification information of the winding machine, the updated number of unloading times of the winding machine, the first doffing time of each yarn spindle and position information of each yarn spindle in the winding machine; and
    sending, by the winding machine, each first information code to the doffer;
    recording, by the doffer, second doffing time of each yarn spindle sleeved outside the yarn connecting rod, responsive to the yarn spindles in the winding machine being sequentially sleeved outside the yarn connecting rod;
    receiving, by the doffer, a plurality of first information codes from the winding machine; and
    determining, by the doffer, for any first information code, a target yarn spindle corresponding to the first information code among the yarn spindles sleeved outside the yarn connecting rod according to a time difference between the first doffing time in the first information code and the second doffing time of each yarn spindle sleeved outside the yarn connecting rod, and coding the first information code on an inner wall of a paper tube of the target yarn spindle.

2. The method of claim 1, further comprising:
    obtaining, by the winding machine, identification information of the doffer;
    wherein generating, by the winding machine, the first information code of each yarn spindle respectively based on the identification information of the winding machine, the updated number of unloading times of the winding machine, the first doffing time of each yarn spindle and the position information of each yarn spindle in the winding machine, comprises:
    generating, by the winding machine, for each yarn spindle, the first information code of the yarn spindle respectively based on the identification information of the doffer, the identification information of the winding machine, the updated number of unloading times of the winding machine, the first doffing time of the yarn spindle and the position information of the yarn spindle in the winding machine, to obtain the first information code of each yarn spindle.

3. The method of claim 1, further comprising:
    controlling, by the winding machine, a timer to record winding time from 0 responsive to fiber yarns being used to wind a paper tube in the winding machine to form yarn spindles; and
    determining, by the winding machine, that the yarn spindles in the winding machine are fully wound responsive to the winding time reaching a set time threshold.

4. The method of claim 1, further comprising:
    determining, by the winding machine, that the yarn spindles in the winding machine are fully wound, responsive to weight of each yarn spindle in the winding machine reaching a set weight threshold.

5. The method of claim 1, wherein the first information code is a QR code or a bar code.

6. The method of claim 1, further comprising:
    sending, by the doffer, the first information code received by the doffer to a packaging machine, responsive to stopping sleeving yarn spindles outside the yarn connecting rod and the corresponding first information code having been coded on an inner wall of a paper tube of each yarn spindle sleeved outside the yarn connecting rod;
    receiving, by the packaging machine, a plurality of first information codes from the doffer;
    determining, by the packaging machine, a corresponding target production batch in a production batch set according to the identification information of the winding machine and the first doffing time in each first information code;
    determining, by the packaging machine, a corresponding target stacking position based on the target production batch;
    generating, by the packaging machine, a moving instruction based on the target stacking position;
    receiving, by the doffer, the moving instruction from the packaging machine; and
    controlling, by the doffer, the doffer to move to the target stacking position and unload yarn spindles in the doffer at the target stacking position in response to the moving instruction.

7. The method of claim 6, further comprising:
    obtaining, by the packaging machine, corresponding product specification information based on the target production batch;

generating, by the packaging machine, a second information code based on the target production batch and the product specification information;

packaging, by the packaging machine, the yarn spindles at the target stacking position to obtain a packaged yarn spindle product responsive to the number or weight of the yarn spindles at the target stacking position meeting a set condition; and coding, by the packaging machine, the second information code on an outer surface of the yarn spindle product.

8. The method of claim 7, wherein the second information code is a QR code or a bar code.

9. An electronic device, comprising:
at least one processor; and
a memory connected in communication with the at least one processor;
wherein the memory stores an instruction executable by the at least one processor, and the instruction, when executed by the at least one processor, enables the at least one processor to execute the method of claim 1.

10. A non-transitory computer-readable storage medium storing a computer instruction thereon, wherein the computer instruction is used to cause a computer to execute the method of claim 1.

* * * * *